United States Patent
Pilard et al.

(10) Patent No.: US 8,139,469 B2
(45) Date of Patent: Mar. 20, 2012

(54) COMPATIBLE OPTICAL RECORDING MEDIUM

(75) Inventors: Gaei Pilard, Moenchweiler (DE);
Larisa von Riewel, Villingen-Schwennigen (DE);
Christophe Fery, Niedereschach (DE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 12/737,206

(22) PCT Filed: Jun. 16, 2009

(86) PCT No.: PCT/EP2009/057416
§ 371 (c)(1),
(2), (4) Date: Dec. 17, 2010

(87) PCT Pub. No.: WO2010/000606
PCT Pub. Date: Jan. 7, 2010

(65) Prior Publication Data
US 2011/0096654 A1   Apr. 28, 2011

(30) Foreign Application Priority Data
Jun. 30, 2008   (EP) ..................... 08159337

(51) Int. Cl.
*G11B 7/24* (2006.01)
(52) U.S. Cl. ..................... 369/275.4; 369/288
(58) Field of Classification Search .... 369/275.1–275.5, 369/13.35, 13.45, 13.46, 13.55, 283, 284, 369/288
See application file for complete search history.

(56) References Cited

U.S. PATENT DOCUMENTS

| | | | | |
|---|---|---|---|---|
| 4,737,947 A | * | 4/1988 | Osato et al. | 369/13.35 |
| 4,741,650 A | * | 5/1988 | Nakata | 408/137 |

FOREIGN PATENT DOCUMENTS

| | | | |
|---|---|---|---|
| EP | 0350078 | | 1/1990 |
| JP | 356061031 A | * | 5/1981 |
| JP | 356061032 A | * | 5/1981 |
| JP | 357074854 A | * | 5/1982 |
| JP | 362080845 A | * | 4/1987 |
| JP | 05101467 | | 4/1993 |

OTHER PUBLICATIONS

Article entitled Database WPI Week 199321, Thomson Scientific, London, GB, Nov. 25, 2008.
Search Report Dated Sep. 8, 2009.

* cited by examiner

*Primary Examiner* — Thang Tran
(74) *Attorney, Agent, or Firm* — Jack Schwartz & Associates, PLLC

(57) ABSTRACT

A compatible optical recording medium is described, which is designed in such a way that it has the appearance of a read-only optical recording medium for most players and recorders. Further described is a method for manufacturing the recordable optical recording medium. The optical recording medium has an essentially flat recording layer with a first reflectivity at a wavelength specified for a reading recording light beam, which has an alloyed guide track formed of the material of the essentially flat recording layer with a second reflectivity different from the first reflectivity at the specified wavelength.

12 Claims, 2 Drawing Sheets

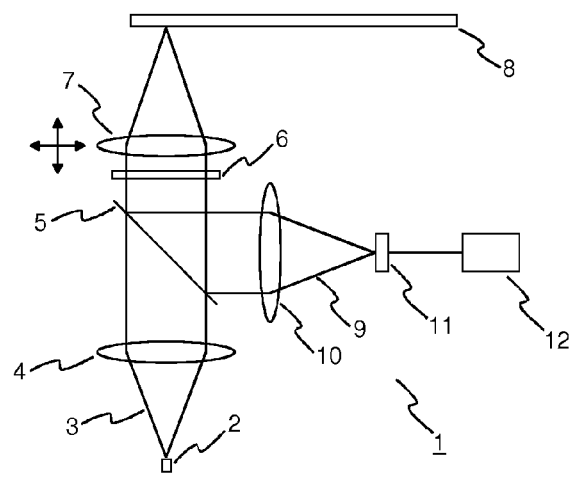
Fig. 1
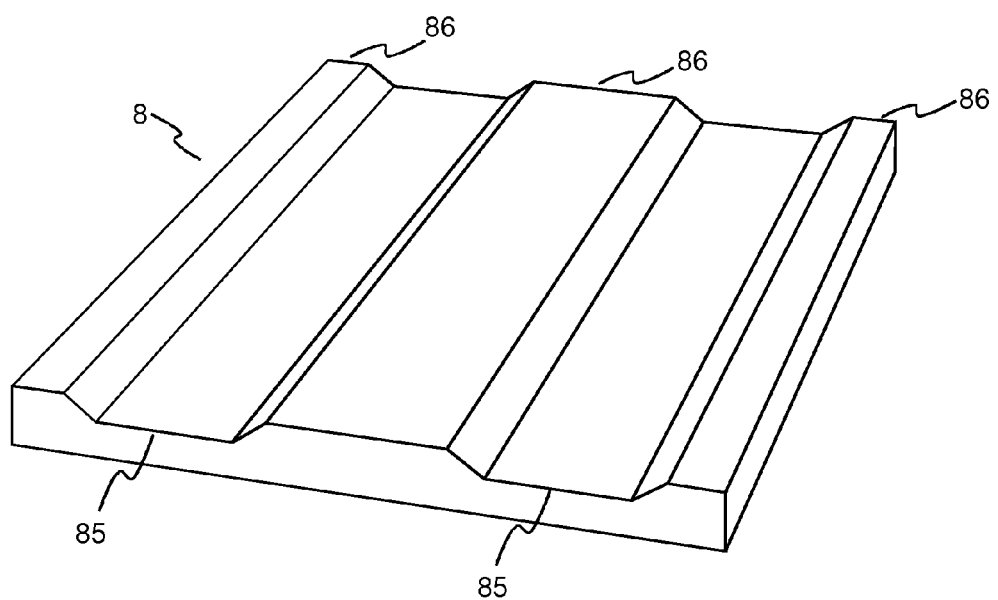
Fig. 2 - Prior Art

COMPATIBLE OPTICAL RECORDING MEDIUM

This application claims the benefit, under 35 U.S.C. §365 of International Application PCT/EP2009/057416, filed Jun. 16, 2009, which was published in accordance with PCT Article 21(2) on Jan. 7, 2010 in English and which claims the benefit of European patent application No. 08159337.8, filed Jun. 30, 2008.

The present invention relates to a format of a recordable optical recording medium, which is designed in such a way that it can be read by any standard player and recorder, and to a method for manufacturing the recordable optical recording medium.

The distribution of digital data such as movies or software on optical recording media today is established as the main distribution channel. However, this means that stores need to stock a large amount of titles in order to be able to provide most requested titles immediately to their customers without having to order them.

In order to reduce this need for a large stock several solutions for a manufacturing on demand or a distribution via networks have been proposed. The optical recording medium, typically a DVD (digital versatile disk), is recorded as soon as a title is requested by a customer. Recording is done with a special recorder provided in a store, with a kiosk type recording terminal, or by a special consumer recorder connected to a network. These special recorders allow to write data to a recordable DVD in such a way that the DVD has the appearance of a CSS-encrypted DVD-Video (ROM) disk, even though it is a specially finalized recordable DVD. For recording the optical recording medium has a groove structure to guide an optical pickup unit relative to the optical recording medium.

In order to establish the above described solutions as further distribution channels, the recorded optical recording media have to be compatible with as many standard players and recorders as possible. While this is usually not a problem for players, the situation is different with recorders.

Several methods are known for detecting the position of the light spot on an optical recording medium. The two most popular are Differential Phase Detection (DPD, used for ROM formats) and differential Push-Pull (used for RE formats). However, those two methods require substrates having embossed features, i.e. pits for ROM formats or a groove/land structure for RE formats. A typical groove/land structure is depicted in FIG. 2. As a copy protection mechanism some optical pickups used in recorders do not allow to retrieve data from an optical recording medium indicated as a read-only medium when a push-pull signal originating from the land/groove structure is found, which is an indication of a recordable optical recording medium. Such incompatibilities have to be avoided.

Also, due to the constantly increasing data capacities, the formation of pits or grooves becomes more and more critical.

The document JP 07-311984 discloses the use of an amorphous formed track spiral used for the tracking signal. However, due to the erasability and the overall limited number of readout cycles, a phase change material is not suitable for a downloadable DVD, which needs to fulfill the DVD-ROM standards.

Similarly, the document U.S. Pat. No. 4,737,947 discloses a recording medium having an optomagnetic recording layer and an optical recording layer. The optical layer includes guide tracks consisting of tracking bits, which are formed by thermal modification of the recording material upon laser irradiation. Write-once phase change materials are used for forming the guide tracks. In this document, the information bits and the tracking bits are recorded into two different layers. The optical recording layer, which carries the tracking bits, has to be isolated from the optomagnetic recording layer carrying the information bits, because the readout of the optomagnetic recording layer is done while the system is tracking using the tracking bits. It is then very important that the tracking bits are not altered during the recording process of the information bits. In the case of a downloadable DVD application, the recording of the information bits is done using the tracking spiral, but the readout is done while the system is tracking with DPD using the information bits. In this case it does not matter if the tracking spiral is somehow altered during the recording process of the information bits. However, the read stability remains a very important item, which cannot be fulfilled using a phase change material.

EP 0 350 078 discloses an optical recording medium comprising a substrate, a recording layer, and a reflective metallic thin film layer provided on the recording layer. The recording layer consists of light transmissive portions and light screening portions. The light screening portions are formed by illuminating and developing a photosensitive layer. Image information derived from the light transmissive portions and the light screening portions of the recording layer acts as a tracking and a preformat in reading out information.

It is an object of the invention to propose a format for a recordable optical recording medium, which has the appearance of a read-only optical recording medium for most players and recorders.

According to the invention, this object is achieved by an optical recording medium with an essentially flat recording layer having a first reflectivity at a wavelength specified for a reading and/or recording light beam, which has an alloyed guide track formed of the material of the essentially flat recording layer with a second reflectivity different from the first reflectivity at the specified wavelength. The alloyed guide track preferably has the shape of a spiral or consists of concentric circles.

The optical recording medium according to the invention has the advantage that it enables tracking without the need for embossed features, e.g. pits or grooves. As a consequence the optical recording medium has the appearance of a read-only optical recording medium and is compatible with most players and recorders. At the same time the problems of erasability and the limited number of readout cycles do not occur when the guide track is formed using write-once materials. A further advantage is that during production of the optical recording medium the embossing step can be omitted.

The different reflectivities of the alloyed guide track and the non-alloyed areas allow to generate a tracking signal, e.g. by using a three-beam method. This is explained below with reference to FIG. 4. Of course, other methods making use of the change of reflectivity for tracking can also be used. It is not relevant whether the reflectivity of the guide track is higher or lower than the reflectivity of the non-alloyed areas.

Preferably, the recording layer is a Cu/Si recording layer. Such a recording layer can easily be alloyed using a intense light beam, e.g. a laser beam. Of course, other material compositions that can be alloyed and show different reflectivities in their alloyed state and their non-alloyed state can likewise be used. Examples of further material compositions are Pd/Te and PdO/Te. The designation X/Y is here used to indicate a layer containing a composition of the constituents X and Y. The ratio of the constituents does not necessarily need to be 1:1. In addition, the layer may include further constituents.

Favorably, the optical recording medium has the following layer stack:

cover layer
ZnS:SiO$_2$
Cu/Si
ZnS:SiO$_2$
reflective layer (Ag alloy)
substrate

The two dielectric ZnS:SiO$_2$ layers are used to adjust the reflectivity and the absorption of the optical stack, and thus also the sensitivity of the recording processes.

Advantageously, the optical recording medium is a DVD-like medium. The DVD today is a well established medium for transporting and providing audio-visual data such as movies. Many households are already equipped with DVD players or recorders. Therefore, it is desirable to make use of the huge customer base also for manufacturing on demand and a distribution via networks.

A method for manufacturing an optical recording medium according to the invention has the steps of:
  applying at least a recording layer on a substrate;
  applying at least a cover layer on the recording layer; and
  forming a guide track within the recording layer by alloying the material of the recording layer.

Similarly, a method for providing an optical recording medium having an essentially flat recording layer with a guide track has the step of forming a guide track within the essentially flat recording layer by alloying the material of the recording layer.

Advantageously, an apparatus for manufacturing an optical recording medium according to the invention has:
  means for applying at least an essentially flat recording layer on a substrate;
  means for applying at least a cover layer on the essentially flat recording layer; and
  means for forming a guide track within the essentially flat recording layer by alloying the material of the recording layer.

Similarly, an apparatus for providing an optical recording medium having an essentially flat recording layer with a guide track has means for forming a guide track within the essentially flat recording layer by alloying the material of the recording layer.

Advantageously, alloying is performed by irradiating the recording layer with an intense light beam along the desired guide track, e.g. a spiral track or concentric circles. Of course thermal processes, such as local heating, can likewise be used for alloying the material of the recording layer.

The alloyed guide track leads to a slightly reduced overall reflectivity with respect to the main spot. This generally is to be avoided in view of the high standard reflectivity value of the DVD-ROM. However, the reduction is comparable to the reduction induced by a normal groove/land structure and does not cause any additional difficulties.

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 schematically shows a pickup for reading from an optical recording medium;

FIG. 2 shows a groove/land structure of a known recordable optical recording medium;

Figure 3:
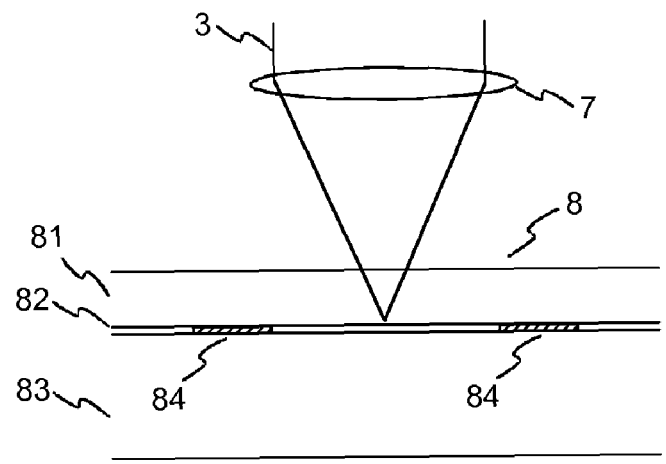
FIG. 3 depicts the structure of an optical recording medium according to the invention.

In FIG. 1 a pickup 1 for reading from an optical recording medium 8 is shown schematically. A laser diode 2 emits a linearly polarized light beam 3, which is collimated by a collimator lens 4. The collimated light beam 3 passes a polarization beam splitter 5 and a quarter wave plate 6, which transforms the light beam 3 into a circular polarized light beam 3, before it is focused onto an optical recording medium 8 by an objective lens 7. The light beam 9 reflected by the optical recording medium 8 is collimated by the objective lens 7 and passes the quarter wave plate 6, which transforms the reflected light beam 9 into a linear polarized light beam 9. Due to the quarter wave plate 6, the direction of polarization of the reflected light beam 9 is perpendicular to the direction of polarization of the initial light beam 3. The reflected light beam 9 is thus deflected by the polarization beam splitter 5 towards a focusing lens 10, which focuses the reflected light beam 9 onto a detector 11. An evaluation circuitry 12 evaluates the signals obtained by the detector 11.

FIG. 2 shows a groove/land structure of a known recordable optical recording medium 8. As can be seen, a plurality of grooves 85 are arranged between the lands 86. The groove/land structure is used for tracking.

In the following the invention is explained with reference to a DVD-like optical recording medium, which is read with a wavelength around 650 nm. Of course, the general idea of the invention is also applicable to other types of optical recording media.

The structure of an optical recording medium 8 according to the invention is shown schematically in FIG. 3. A polycarbonate cover-layer 81 protects an essentially flat recording layer 82. The essentially flat recording layer 82 is arranged on a substrate 83 and consists of a material that can be alloyed. A guide track 84 is formed within the essentially flat recording layer 82. The guide track 84 is formed by alloying the material of the essentially flat recording layer 82. For simplicity a reflective layer beneath the recording layer 82 as well as additional spacer layers are omitted in the figure. Despite the guide track 84 the optical recording medium 8 essentially resembles a DVD-ROM.

Figure 4:
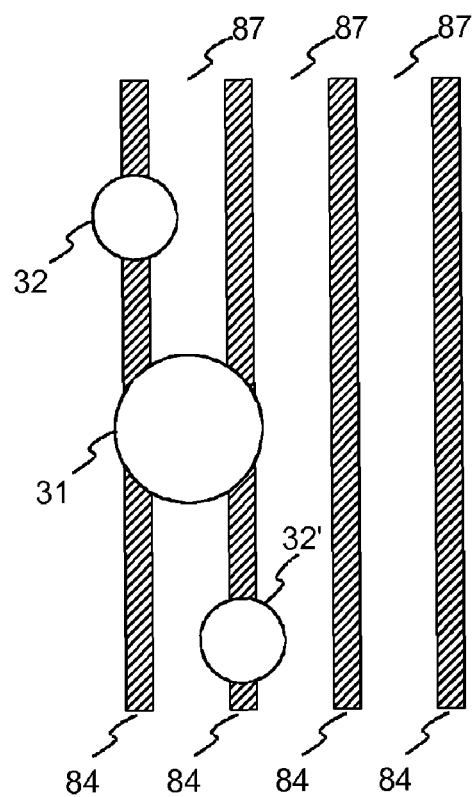
FIG. 4 illustrates a tracking scheme suitable for the optical recording medium according to the invention.

A tracking scheme suitable for the optical recording medium 8 according to the invention is illustrated in FIG. 4. The tracking scheme is known as three-beam tracking. A main light beam 31 is located between two adjacent guide tracks 84. Two side beams 32, 32' are arranged relative to the main light beam 31 in such way that they fall onto the adjacent guide tracks 84 when the main light beam 31 is exactly located in the center between the two adjacent guide tracks 84. The reflected side beams 32, 32' are detected by separate detector elements of the photo detector 11. As the reflectivity of the guide tracks 84 is different from the reflectivity of the non-alloyed areas 87 between the guide tracks 84, any displacement of the side beams 32, 32' relative to the guide tracks 84 manifests itself as a change of the intensity detected by the separate detector elements of the photo detector 11. This change of intensity is used for tracking.

The invention claimed is:

1. An optical recording medium comprising an essentially flat recording layer having a first reflectivity at a wavelength specified for a reading or recording light beam, and a guide track having a second reflectivity different from the first reflectivity at the specified wavelength, wherein the guide track is an alloyed guide track formed by alloying of the material of the essentially flat recording layer.

2. The optical recording medium according to claim 1, wherein the essentially flat recording layer includes a Cu/Si composition, a Pd/Te composition, or a PdO/Te composition.

3. The optical recording medium according to claim 1, wherein the guide track is formed by laser irradiation or a thermal process.

4. The optical recording medium according to claim 1, wherein it is a DVD-like medium.

5. A method for manufacturing an optical recording medium, the method comprising the steps of:
   forming at least an essentially flat recording layer on a substrate; and
   forming a guide track within the essentially flat recording layer by alloying the material of the recording layer.

6. The method according to claim 5, wherein alloying is performed by irradiating the essentially flat recording layer with an intense light beam along the desired guide track, or by applying a thermal process to the area of the desired guide track.

7. The method according to claim 5, wherein the essentially flat recording layer includes a Cu/Si composition, a Pd/Te composition, or a PdO/Te composition.

8. The method according to claim 5, wherein the optical recording medium is a DVD-like medium.

9. The method according to claim 5, comprising the step of applying at least a cover layer on the essentially flat recording layer.

10. An apparatus for manufacturing an optical recording medium, the apparatus comprising:
    means for applying at least an essentially flat recording layer on a substrate; and
    means for forming a guide track within the essentially flat recording layer by alloying the material of the recording layer.

11. The apparatus according to claim 10, wherein the means for forming the guide track is a light source for irradiating the essentially flat recording layer with an intense light beam along the desired guide track, or a thermal processing means for applying a thermal process to the area of the desired guide track.

12. The apparatus according to claim 10, comprising means for applying at least a cover layer on the essentially flat recording layer.

* * * * *